Patented July 10, 1951

2,560,137

UNITED STATES PATENT OFFICE 2,560,137

DIAZOTYPE PHOTOPRINTING MATERIAL

Sam C. Slifkin, Binghamton, N. Y., assignor to General Aniline & Film Corporation, New York, N. Y., a corporation of Delaware No Drawing. Application December 21, 1948, Serial No. 66,570

6 Claims. (Cl. 95—6)

This invention relates to diazotype photoprinting, and materials employed therein.

In diazotype photoprinting, a light sensitive layer is provided on a support or base, such as paper, films, plastic materials, textiles, ceramics such as glass, metals and the like, containing a light sensitive diazotype compound which is destroyed or altered upon exposure to light so as to render it incapable of reacting with an azo coupling component to form an azo dye coloration. After exposing the diazotype layer to light of locally varied intensity in accordance with an original pattern or design to be reproduced, as by exposure under a line drawing or photographic diapositive, the image is developed by causing the residual diazo compound to couple with an azo coupling component. In a so-called two-component diazotype layer, the azo coupling component is incorporated in the layer together with the light sensitive diazo compound, the composition being suitably stabilized against coupling prior to development, and after exposure under an original to be reproduced, the image is developed, for example, by alkaline treatment, especially by exposure to an alkaline vapor such as ammonia or another volatile nitrogen base. Alternatively, development can be effected by treatment with an alkaline reacting aqueous solution, for example, aqueous solutions of ammonia, basic amines, or salts such as sodium carbonate, trisodium phosphate or the like. A so-called one-component layer contains the diazo compound without the azo coupling component, the latter being applied in the developing solution together with the alkaline material adapted to promote coupling.

Light sensitive diazo compounds commonly employed heretofore include, especially, stabilized diazotized compounds of the paraphenylene diamine series, wherein preferably one of the amino groups is substituted by a radical such as an alkyl or an acyl group which renders it incapable of diazotization. Azo coupling components commonly employed heretofore include naphthols such as beta-naphthol, 2,3- and 2,7-dihydroxynaphthalene, and sulfo acids thereof such as 2-hydroxy naphthalene-3,6-disulfo acid (R-salt). Combinations of light sensitive diazo compounds of the paraphenylene diamine series with naphthol coupling components such as those mentioned above, yield a variety of blue shades, generally having a reddish cast.

One of the problems arising the preparation of diazotype photoprinting material resided in the provision of azo coupling components yielding neutral blue shades with light sensitive diazo compounds of the aforesaid type, having high color strength, and adapted to be combined with other coupling components to yield black shades. In compounding such combinations containing other coupling components yielding desired complementary colorations to form a black shade (e. g. resorcinol and acetoacetanilide), it is necessary to employ a blue coupling component having relatively low coupling potential, to avoid premature coupling and permit prolonged storage of the photoprinting material without substantial deterioration.

At the same time, it is necessary that the colorations produced with such coupling components yield shades of high color strength, good fastness to light and washing, and possessing stability against discoloration of the light-colored background after exposure and development, as well as stability to premature coupling before exposure.

As noted above, the coupling components heretofore employed to produce blue shades have an excessive reddish cast, or are characterized by an excessively high coupling potential. Combinations of light sensitive diazo compounds of the paraphenylene diamine series with coupling components yielding pure blue shades, characterized by low coupling potential and having the aforesaid fastness properties, color strength, and stability to discoloration or premature coupling, were heretofore unknown in the diazotype art.

It is accordingly an object of this invention to provide diazotype sensitizing and developing compositions and processes, and light sensitive diazotype photoprinting material in which the coupling component, when combined with light sensitive diazo compounds of the paraphenylene diamine series, yields vivid neutral blue colorations of high color strength, affords the required fastness properties and stability before and after coupling, and possesses sufficiently low coupling potential whereby it is adapted to be combined with other coupling components to form a full range of mixed colorations, especially gray to black shades.

I have discovered that 2,7-dihydroxynaphthalene-3,6-disulfonic acid and the corresponding sulfonamides, when employed as a coupling component for light sensitive diazo compounds of the paraphenylene diamine series in diazotype photoprinting yield light sensitive layers and copies having all of the aforesaid advantages.

Thus, when the aforesaid coupling components of this invention are combined with the aforesaid light sensitive diazo compounds, they yield vivid blue shades as distinguished from 2,3-dihydroxynaphthalene or 2-hydroxy-3,6-naphthalene sulfonic acid which yields reddish blue shades. Whereas 2,3-dihydroxynaphthalene was previously considered to have a satisfactory coupling potential for use as a blue coupler in mixed diazotype compositions, the coupling component of this invention has an even lower coupling potential in addition to greater purity of shade, whereby superior black images can be produced by combination with other couplers yielding complementary colorations. This is especially surprising, since the introduction of sulfo groups into other hydroxynaphthalenes, e. g. 2,3-dihydroxynaphthalene, yields compounds which still have a coupling potential somewhat higher than desirable, as for example, 2,3-dihydroxynaphthalene-6-sulfonic acid. In addition, the images produced with the new coupler of this invention have superior light fastness as compared with images similarly produced with 2,7-dihydroxynaphthalene, and greater stability to discoloration, for example, by iron compounds sometimes present in the paper or light sensitive layers, than 2,3-dihydroxynaphthalene. Despite the presence of two sulfo or sulfonamide groups in addition to two hydroxy groups in the molecule, the fastness of the images produced with the couplers of this invention to washing is entirely satisfactory, providing the light sensitive diazo compound is free of nuclear water-solubilizing substituents such as sulfo or carboxy groups. Furthermore, when incorporated in two-component diazotype layers, compositions containing the azo coupling component of this invention are exceptionally stable against premature coupling and cause no excessive background discoloration after development of the image.

While the coupling components of this invention can be employed in the development of one-component diazotype materials, photoprinting materials of this invention are preferably of the two-component type, including light sensitive diazo compounds of the paraphenylene diamine series, especially those in which one of the amino groups is substituted and thereby blocked for diazotization, such diazo compounds being ordinarily in the form of stable derivatives such as the double salts of the diazonium halide with inorganic halides such as zinc chloride, tin chloride, boron trifluoride and the like. Two-component diazotype photoprinting material thus prepared can be conveniently developed after exposure to light by treatment with ammonia vapor.

The following examples illustrate preferred methods of preparing two-component diazotype photoprinting materials in accordance with this invention.

*Example 1*

A diazotype sensitizing composition is prepared by dissolving the following ingredients in 100 cc. of water:

5 cc. ethylene glycol
5 gs. citric acid
5 gs. zinc chloride
5 gs. thiourea
3 gs. 2,7 - dihydroxynaphthalene - 3,6 - disodium sulfonate
2 gs. p-diethylamino benzene diazonium chloride zinc chloride double salt The resulting solution is coated on paper stock and dried thereon. The resulting light sensitive layer is exposed to light under an original to be copied, and developed by exposure to ammonia vapor. A deep blue positive print is obtained having excellent fastness to light, satisfactory fastness to washing, and stability to background discoloration. The light sensitive photoprinting material obtained has outstanding stability against discoloration or premature coupling during storage for prolonged periods.

*Example 2*

A sensitizing composition, compounded to yield black shades on development, is prepared by dissolving the following ingredients in 100 cc. of water:

5 cc. ethylene glycol
8 gs. citric acid
5 gs. zinc chloride
5 gs. thiourea
0.5 g. resorcinol
0.1 g. acetoacetanilide
3.8 gs. 2,7-dihydroxynaphthalene - 3,6 - disodium sulfonate
2.8 gs. p-diethylamino benzene diazonium chloride zinc chloride double salt This composition was coated on paper and dried, and the resulting photoprinting material exposed under an original and developed as described in Example 1. A deep black positive image is thereby obtained having similar fastness properties to those of the material produced in the first example. The photoprinting material obtained likewise possessed similar stability against discoloration from premature coupling or atmospheric conditions.

Instead of the zinc chloride double salt of p-diethylamino benzene diazonium chloride employed in the foregoing examples, other diazo compounds of the paraphenylenediamine series, especially those having substituents in one amino group, can be used, e. g. paraphenylenediamines containing alkyl groups such as methyl or ethyl groups, hydroxyalkyl groups such as hydroxyethyl or 2,3-dihydroxypropyl groups, or phenyl groups as substituents of one amino group. Thus, suitable light sensitive diazo compounds include, for example, diazo derivatives of 4-monoethylamino - m - toluidine, p-amino-N-methylaniline, p-amino-N-2-hydroxyethylaniline, p-amino-N-ethyl - N - 2′ - hydroxyethylaniline, 4 - amino-2-methoxy - N - cyclohexylaniline, p-amino-N-diethyl-m-toluidine, and p-aminodiphenylamine. The last of these is especially advantageous in that it yields a particularly vivid blue shade. The diazo compounds are ordinarily employed in the form of zinc chloride, tin chloride, or boron trifluoride double salts or complex addition products. To insure adequate fastness to washing, the light sensitive diazo compound preferably contains no water-solubilizing groups such as carboxy or sulfo groups in the molecule.

The 2,7-dihydroxynaphthalene-3,6-disulfonic acid can be used in free acid form or in the form of its alkali metal salts. Instead of these compounds, corresponding 2,7-dihydroxynaphthalene-3,6-disulfonamide can be used as the azo coupling component in the light sensitive layers illustrated in the examples, or as a developer for a one-component layer.

In the preparation of mixtures yielding black images, coupling components yielding yellow and red azo compounds are employed in conjunction with the coupling components of this invention, such as acetoacetanilide and resorcinol.

The two-component sensitizing compositions as illustrated in the examples, may include other conventional ingredients comprising, for example, anti-oxidants such as thiourea, metallic salts such as zinc chloride or tin chloride, stabilizers against premature coupling such as citric, tartaric, mellitic, formic or sulfobenzoic acids, wetting agents such as saponine, and penetrants such as ethylene glycol or other water-soluble alcohols.

Instead of paper, other base materials can be sensitized such as regenerated cellulose films, and plastic materials such as cellulose acetate, polyvinyl alcohol, ethyl cellulose ether, and polyvinyl acetate. If a plastic base is used which is substantially impervious to water, an organic swelling agent for the plastic can be included in the sensitizing solution.

Development is carried out preferably by exposure to alkaline vapors such as ammonia or lower aliphatic amines, although development can also be carried out by applying an aqueous alkaline solution, e. g. of sodium carbonate, trisodium phosphate, triethanolamine, ammonium hydroxide or the like, to the photoprinting material after exposure under an original. For one-component systems, the sensitized material can be prepared as described in the examples except that the azo coupling component or composition is omitted, and included instead in an aqueous alkaline solution applied to the exposed photoprinting material for development thereof.

Variations and modifications which will be obvious to those skilled in the art can be made in the details of the foregoing procedure, without departing from the scope or nature of the invention.

I claim:

1. Diazotype photoprinting material having thereon a light sensitive layer comprising a light sensitive diazo compound of the paraphenylene diamine series, and as a coupling component, a member of the class consisting of 2,7-dihydroxynaphthalene-3,6-disulfonic acid and the corresponding sulfonamide.

2. Diazotype photoprinting material having thereon a light sensitive layer comprising a light sensitive diazotized paraphenylene diamine having at least one hydrocarbon radical as a substituent in one of the amino groups and containing no water-solubilizing substituents, and as an azo coupling component, a member of the class consisting of 2,7-dihydroxynaphthalene-3,6-disulfonic acid and the corresponding sulfonamide.

3. Diazotype photoprinting material having thereon a light sensitive layer comprising a light sensitive diazotized paraphenylene diamine having at least one hydrocarbon radical as a substituent in one of the amino groups and containing no water-solubilizing substituents, and as an azo coupling component, a member of the class consisting of 2,7-dihydroxynaphthalene-3,6-disulfonic acid and the corresponding sulfonamide, together with an acylacetanilide and a resorcinol.

4. Diazotype photoprinting material having thereon a light sensitive layer comprising a light sensitive diazo compound of N,N-diethyl paraphenylene diamine, and as an azo coupling component 2,7-dihydroxynaphthalene-3,6-disulfonic acid.

5. Diazotype photoprinting material having thereon a light sensitive layer comprising a light sensitive diazo compound of N-phenyl paraphenylene diamine, and as an azo coupling component 2,7-dihydroxynaphthalene-3,6-disulfonic acid.

6. Diazotype photoprinting material having thereon a light sensitive layer comprising a light sensitive diazo compound of N,N-diethyl paraphenylene diamine, and as azo coupling components, 2,7-dihydroxynaphthalene-3,6-disulfonic acid, acetoacetanilide, and resorcinol.

SAM C. SLIFKIN.

REFERENCES CITED

The following references are of record in the file of this patent:

UNITED STATES PATENTS

| Number | Name | Date |
|---|---|---|
| 1,989,065 | Schmidt | Jan. 22, 1935 |
| 2,405,523 | Sease | Aug. 6, 1946 |